(12) United States Patent
Kindler et al.

(10) Patent No.: US 6,291,093 B1
(45) Date of Patent: Sep. 18, 2001

(54) FUEL CELL ELEMENTS WITH IMPROVED WATER HANDLING CAPACITY

(75) Inventors: Andrew Kindler, San Marino; Albany Lee, Arcadia, both of CA (US)

(73) Assignee: California Institute of Technology, Pasadena, CA (US)

( * ) Notice: Subject to any disclaimer, the term of this patent is extended or adjusted under 35 U.S.C. 154(b) by 0 days.

(21) Appl. No.: 09/198,077

(22) Filed: Nov. 23, 1998

Related U.S. Application Data

(60) Provisional application No. 60/066,850, filed on Nov. 25, 1997.

(51) Int. Cl.[7] .................................................... H01M 8/04
(52) U.S. Cl. .................................................... 429/34
(58) Field of Search ................... 429/13, 34, 35, 429/38, 39

(56) References Cited

U.S. PATENT DOCUMENTS

| | | |
|---|---|---|
| 3,418,168 | 12/1968 | Wentworth . |
| 3,880,670 | 4/1975 | Shinn . |
| 4,175,165 | 11/1979 | Adlhart . |
| 4,219,611 | 8/1980 | Breault . |
| 5,292,600 | 3/1994 | Kaufman . |
| 5,447,636 | 9/1995 | Banerjee . |
| 5,523,177 | 6/1996 | Kosek et al. . |
| 5,641,586 | 6/1997 | Wilson . |
| 5,716,664 | 2/1998 | Marchetti . |
| 6,024,848 | * 2/2000 | Dufner et al. . |

FOREIGN PATENT DOCUMENTS

WO 96/18216    6/1996 (WO) .

* cited by examiner

*Primary Examiner*—Carol Chaney
*Assistant Examiner*—Susy Tsang
(74) *Attorney, Agent, or Firm*—Fish & Richardson P.C.

(57) ABSTRACT

New fuel cell components for use in liquid feed fuel cell systems are provided. The components include biplates and endplates, having a hydrophilic surface and allow high efficiency operation. Conductive elements and a wicking device also form a part of the fuel cell components of the invention.

19 Claims, 3 Drawing Sheets

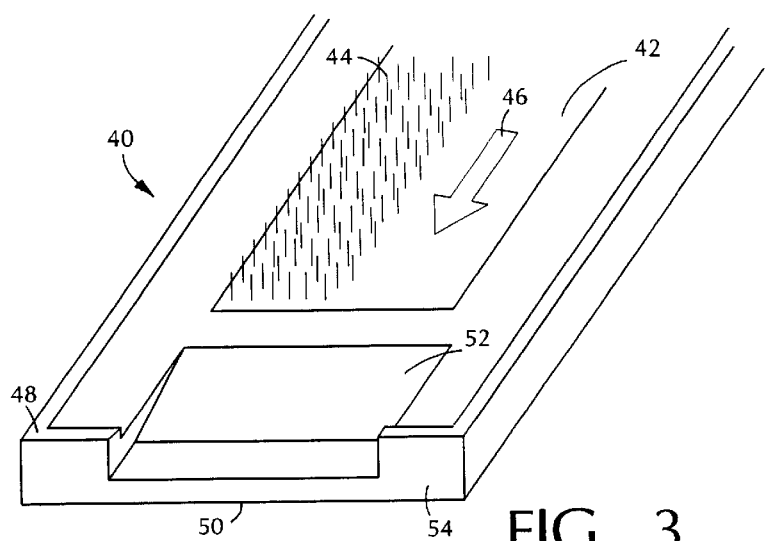
FIG. 3
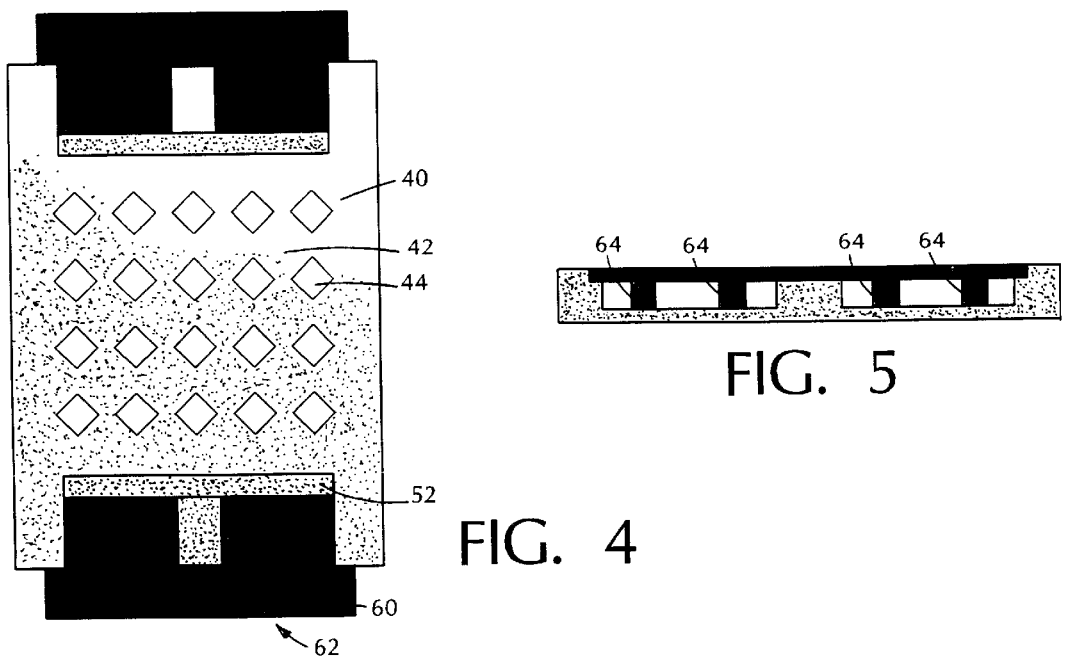
FIG. 4
FIG. 5

FUEL CELL ELEMENTS WITH IMPROVED WATER HANDLING CAPACITY

CROSS REFERENCE TO RELATED APPLICATIONS

This application claims the benefit of provisional U.S. Patent application, Ser. No. 60/066,850, filed Nov. 25, 1997.

STATEMENT AS TO FEDERALLY SPONSORED RESEARCH

The invention described herein was made in the performance of work under a NASA contract, and is subject to the provisions of Public Law 96-517 (35 U.S.C. 202) in which the Contractor has elected to retain title.

FIELD OF THE INVENTION

The invention relates to the methods and apparatus of generating energy through low-cost, efficient processes. More specifically, the invention relates to components of a fuel cell for generating electricity.

BACKGROUND OF THE INVENTION

Methanol fuel cells promise to provide efficient and low-cost electrical current from methanol without burning the fuel. Therefore, pollution from combustion is not created by the use of such fuel cells. The fuel cells can be at least as efficient as gasoline engines; they run cool, without the need for insulation and structural reinforcement; and rely on a relatively inexpensive fuel. The methanol fuel cells which were designed initially produced about 100 W, running up to 200 continuous hours, and up to 3,000 intermittent hours, without suffering any loss in performance. The goal is to produce units which can generate up to 40 kW, which would be enough to power a full-size automobile, and which can run for at least 1,000 continuous hours.

The biplate is a two-sided component which is placed between the membrane electrode assemblies (MEAs) in a fuel cell stack. One side of the biplate is oriented to face the anode of one MEA, and the other side of the biplate is oriented to face the cathode of another MEA. The biplate provides electrical contact to the MEAs. It also acts to separate air or oxygen provided to the cathode of one MEA and the fuel provided to the anode of the other MEA. As such it forms part of the fuel cell compartment containing either fuel or air.

The endplate is a fuel cell component which forms part of the last fuel cell compartment in a stack, if a stack is present. If the cells are not stacked, the endplate is simply a wall of the fuel cell. The endplate provides electrical contact between an electrode of the fuel cell and the electrical load which spans the fuel cell or stack of fuel cells. The endplate is simply a single-ended biplate. Thus, both fuel cell components, biplates and endplates, are conductive elements.

Typical biplates and endplates are made of a graphite/polymer composite. The polymer is a polymer binder which has the functional effect of making the biplate an extremely hydrophobic surface.

At this time, cost is the major factor limiting methanol fuel cell commercialization. One difficulty in the operation of methanol fuel cells is the water that normally accumulates in the channels of the cathode side of the biplate. The source of this water can be from the chemical reaction of the fuel cell, it can be a result of electroosmosis from the anode side, or it can be a result of simple diffusion. If the accumulated water is not removed, the performance of the fuel cell can suffer. The traditional way to remove this accumulated water has been by pressurized air.

It is desirable to design fuel cell systems which work at temperatures between 25 and 45° C. However, the power output of methanol fuel cells at 25° C. is only about 15–20% of the same cell operating at 90° C. Thus, it becomes important to reduce the energy consumption of ancillary processes as much as possible. For example, power consumption of a pressurized air delivery system can unacceptably diminish the advantages of a room temperature methanol fuel cell. It is considered desirable to design such cells so as to minimize the air flow required to remove accumulated water.

SUMMARY OF THE INVENTION

The invention results from the use of a new fuel cell component assembly in liquid feed fuel cells. The fuel component assembly minimizes resistance to air flow which is required to remove accumulated water from biplates and endplates of the fuel cell. This aspect leads to specifically designed ports at the upper and lower edges of the plates, specifically fabricated plate surfaces, and a specific orientation and spatial arrangement of the conductive elements which are included in the plates.

The costs associated with ancillary systems, such as the power needed to operate water removal systems, are lower in the new plate assembly, for reasons directly attributable to the new design.

The new fuel cell component demonstrates that the improvements which are possible are extremely practical in nature, and can be used in fuel cells for automobiles, lawn mowers, portable electrical devices, stand-alone power generators, and in replacement of the internal combustion engine generally. This also finds use in fuel cells used in the space shuttle and other high-end applications.

As used herein, a "biplate" is a two-sided separator which prevents fluid communication between compartments of fuel cells which cannot be in fluid communication for the cell to function properly. For example, a biplate can prevent fluid communication between the adjacent negative and positive electrodes of a fuel cell. A biplate may also prevent fluid communication between the last compartment of a fuel cell in a stack and the exterior of the fuel cell. This last aspect of the definition of biplate includes the specific fuel cell components which are found at each end of a stack of cells, also referred to as the endplates. "Endplates" are merely biplates which are not between fuel cell compartments, but are found at the terminus of a fuel cell stack.

Unless otherwise defined, all technical and scientific terms used herein have the same meaning as commonly understood by one of ordinary skill in the art to which this invention belongs. Although methods and materials similar or equivalent to those described herein can be used in the practice or testing of the present invention, suitable methods and materials are described below. All publications, patent applications, patents and other references mentioned herein are incorporated by reference in their entirety. In case of conflict, the present specification, including definitions, will control. In addition, the materials, methods and examples are illustrative only and not intended to be limiting.

BRIEF DESCRIPTION OF THE DRAWINGS

These and other aspects of the invention will now be described with reference to the attached drawings, in which:

FIG. 3 is a perspective view of a plate;

FIG. 4 is a front view of a plate of an embodiment;

FIG. 5 is an end view of the plate of an embodiment;

DESCRIPTION OF THE PREFERRED EMBODIMENTS

Figure 1:
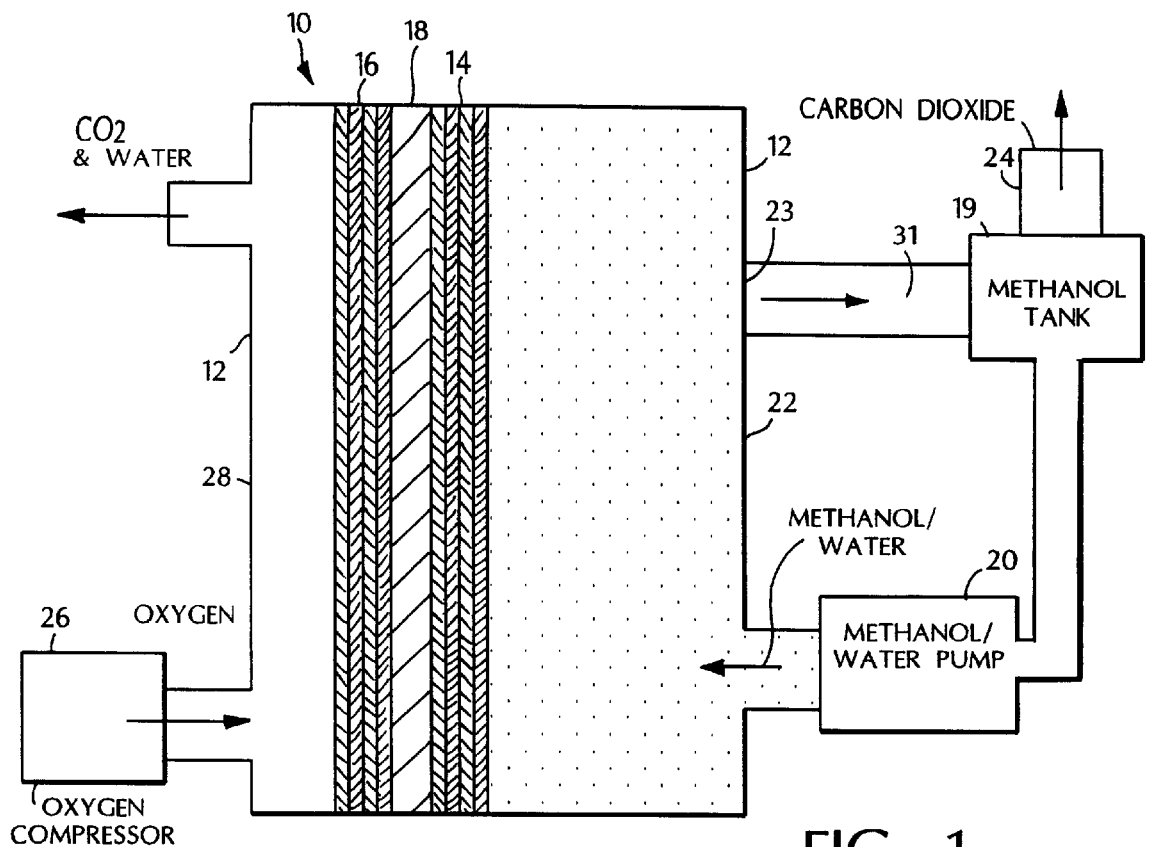
FIG. 1 is a schematic diagram of a particular embodiment of a liquid feed fuel cell.

Devices which are able to convert chemical energy into electrical energy are commonly referred to as batteries. Fuel cells are a special class of batteries in which high energy chemical reactants are continuously fed into the battery and the lower energy chemical products are continuously removed. Batteries can comprise one or several individual cells. A single cell includes a negative electrode and a positive electrode. An electrolytic solution separates the electrodes. When the cell is discharging (converting chemical to electrical energy), an oxidation reaction occurs at the negative electrode (anode). At the positive electrode (cathode), a reduction reaction occurs during discharging.

For the electrode reactions of any corresponding pair of anode and cathode (an electrochemical couple), electrons pass through the external circuit from the anode to the cathode. Completion of the circuit occurs when ionic species are transferred across the cell through the intervening electrolyte. The change from electronic conduction to ionic conduction occurs at the electrodes and involves an electrochemical (Faradaic) reaction. However, electrons cannot pass through the electrolyte, or short circuiting will result in cell self-discharge.

The reactions described above consist of a sequence of more elementary and microscopically scaled steps. In any case, the reactants must approach each other within molecular distances, and the products must be continuously removed for the cell to operate properly. Electrons from the external circuit must reach or leave the reaction sites. Therefore, the reaction sites must be electrically connected to the external circuit. Typically, ionic species must migrate toward or away from the reaction site. Concentration variations can therefore affect reaction rates. There may also be ion transport through solid phases. Energy losses associated with concentration variations produce lowered cell potential. These losses are termed the concentration overpotential. There is also heat associated with the energy required to transport ions through the electrolyte, to carry the electric current. This heat is called the resistance loss or Ohmic overpotential. Energy is also necessary to drive the chemical reactions which are to take place, resulting in a production of heat, rather than electrical energy. Energy losses caused by driving the transfer of charge at the electrodes results in a reduction in the cell potential (surface overpotential). Heat is produced irreversibly by each loss process described above, and is defined by each overpotential multiplied by the electrical current. This heat is always positive, resulting in a hotter cell. Reversible heat is also associated with cell operation, which can either add or remove heat. Besides voltage losses, losses in overall energy occur when side reactions (corrosion reactions) occur.

The driving force which pushes electrons through the electrical circuit is the change in the free energy:

$$G = H - TS$$

where H is the enthalpy (heat content), S is the entropy, and T is the temperature. The cell potential U is related to the free energy change as follows:

$$\Delta G = -nFU$$

where $\Delta G$ is the free energy change for the overall cell reaction based on the reversible transfer of n equivalents of electrons, and F is the Faraday constant. This relation holds in the absence of corrosion reactions.

Conventional methanol fuel cells generate water on the cathode side of the cell compartments through several processes. This water needs to be removed continually for the efficient operation of such cells. Pressurized air or oxygen was required to remove the water by blowing across the cathode surface. The energy required to remove this water lowered the efficiency of methanol fuel cells, particularly at low temperatures (from 25° C. to about 45° C.), where the fuel cells are least efficient, and energy losses are felt most keenly.

It has been noted by the present inventors that fuel cell components can be made in such a way as to minimize the energy needed to remove water from the cathode surface of such components. Fuel cell systems utilizing such components are able to operate more efficiently these lower temperatures.

The inventive plates, which can include biplates and endplates, are useful in fuel cells, particularly in liquid feed fuel cells. A preferred embodiment discloses a biplate which is useful in liquid feed fuel cells in which a liquid is to be removed from fuel cell compartments. Water-containing liquids work well for the purposes of this embodiment.

Figure 2:
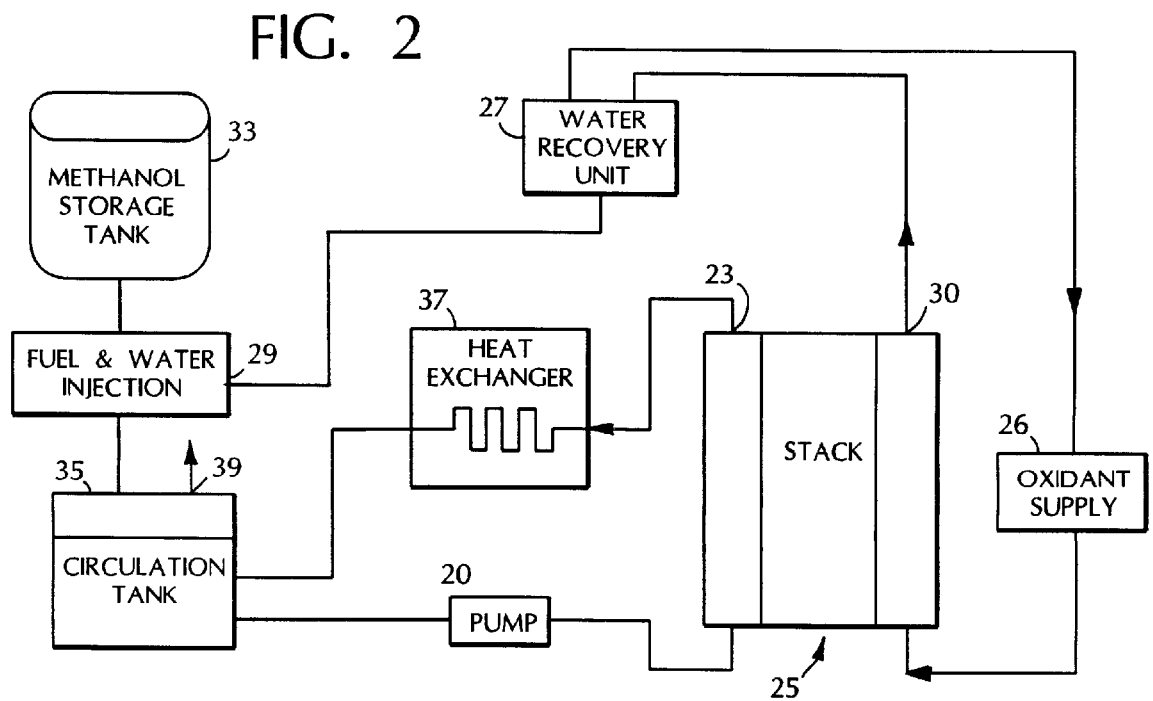
FIG. 2 is a schematic diagram of a particular embodiment of a liquid feed fuel cell system employing a stack of fuel cells.

FIG. 1 illustrates a particular embodiment of liquid feed organic fuel cell 10 having housing 12, anode 14, cathode 16 and solid polymer proton-conducting cation-exchange electrolyte membrane 18. As will be described in more detail below, anode 14, cathode 16 and solid polymer electrolyte membrane 18 are preferably a single multi-layer composite structure, referred to herein as a membrane-electrode assembly (MEA). Pump 20 is provided for pumping an organic fuel and water solution into anode chamber 22 of housing 12. The organic fuel and water mixture is withdrawn through outlet port 23 and is re-circulated through a re-circulation system described below with reference to FIG. 2 which includes methanol tank 19. Carbon dioxide formed in the anode compartment is vented through port 24 within tank 19. Oxygen or air compressor 26 is provided to feed oxygen or air into cathode chamber 28 within housing 12. FIG. 2, described below, illustrates a particular embodiment of a fuel cell system incorporating a stack of individual fuel cells including the re-circulation system. The following detailed description of the fuel cell of FIG. 1 primarily focuses on the structure and function of anode 14, cathode 16 and membrane 18.

Prior to use, anode chamber 22 is filled with the organic fuel and water mixture and cathode chamber 28 is filled with air or oxygen. During operation, the organic fuel is circulated past anode 14 while oxygen or air is pumped into chamber 28 and circulated past cathode 16. When an electrical load (not shown) is connected between anode 14 and cathode 16, electro-oxidation of the organic fuel occurs at anode 14 and electro-reduction of oxygen occurs at cathode 16.

At the anode, a fuel and water mixture flows at a flow rate of from about 10 to about 500 ml/minute, and the following reaction takes place.

Anode: $CH_3OH + H_2O \rightarrow CO_2 + 6H^+ + 6e^-$

Carbon dioxide produced by the above reaction is withdrawn along with the fuel and water solution through outlet 23 and through passage 31 and separated from the solution in a gas-liquid separator (described below with reference to FIG. 2). The fuel and water solution is then re-circulated into the cell by pump 20.

Simultaneous with the electrochemical reaction described in the anode equation above, another electrochemical reaction involving the electro-reduction of oxygen, which captures electrons, occurs at cathode 16 and is given by:

Cathode: $O_2 + 4H^+ + 4e^- \rightarrow 2H_2O$

Overall, in the cell, the reaction is therefore written as:

$CH_3OH + 1.5O_2 \rightarrow CO_2 + 2H_2O$

The occurrence of different reactions at the anode and cathode gives rise to a voltage difference between the two electrodes. Electrons generated by electro-oxidation at anode 14 are conducted through the external load (not shown) and are ultimately captured at cathode 16. Hydrogen ions or protons generated at anode 14 are transported directly across membrane electrolyte 18 to cathode 16. Thus, a flow of current is sustained by a flow of ions through the cell and electrons through the external load.

The reaction takes place over a catalyst. The catalyst is located in the fuel cell anode. Catalysts are well known in the art as providing activated surfaces upon which these reactions can take place. Preferred catalysts for the methanol fuel cells of the invention are platinum/ruthenium catalysts. A carbon supported catalyst is preferred because catalyst consumption is thereby minimized, and adhesion to the substrate is increased.

Membrane 18 can be formed from NAFION™ (a copolymer of tetrafluoroethylene, and perfluoropolyether sulfonic acid), modified perfluorinated sulfonic acid polymer, polyhydrocarbon sulfonic acid or composites of two or more kinds of proton exchange membranes.

Anode 14 can be formed from platinum-ruthenium alloy particles either as fine metal powders, that is, "unsupported", or dispersed on high surface area carbon, that is, "supported". Other platinum-based alloys include those made with tin, iridium, osmium or rhenium as the second metal. For platinum-ruthenium, the loading of the alloy particles in the electrocatalyst layer is preferably in the range of 0.5–4.0 mg/cm².

Cathode 16 is a gas diffusion electrode in which platinum particles are bonded to one side of membrane 18, and is preferably formed from unsupported or supported platinum bonded to a side of membrane 18 opposite to anode 14. Typically available materials and methods of fabrication for the above components are given, for example, in U.S. Pat. No. 5,773,162, which is incorporated by reference to the extent necessary for proper understanding.

FIG. 2 shows a particular embodiment of a fuel cell system employing a stack of fuel cells similar to the fuel cell shown in FIG. 1. The fuel cell system includes stack 25 of fuel cells, each having the membrane/electrode assembly described above with reference to FIG. 1. Oxygen or air is supplied by oxidant supply 26 which may be, for example, a bottled oxygen supply, an air-blowing fan or an air compressor. An air and water or oxygen and water mixture is withdrawn from stack 25 through outlet port 30 and conveyed to water recovery unit 27, which operates to separate the air or oxygen from the water. A portion of the air or oxygen separated by unit 27 is returned to oxidant supply 26 for re-entry into stack 25. Fresh air or oxygen is added to supply 27. Water separated by unit 27 is fed to fuel and water injection unit 29 which also receives an organic fuel, such as methanol, from storage tank 33. Injection unit 29 combines the water from recovery unit 27 with the organic fuel from tank 33, yielding a fuel and water solution with the fuel dissolved in the water.

The fuel and water solution provided by injection unit 29 is fed into a circulation tank 35. A fuel and water mixture containing carbon dioxide is withdrawn through port 23 from stack 25 and is fed through a heat exchanger 37 and into circulation tank 35. Hence, circulation tank 35 receives both a fuel and water solution from injection unit 29 and a fuel and water solution from heat exchanger 37. Circulation tank 35 extracts carbon dioxide from the fuel and water mixture and releases the carbon dioxide through vent 39. The resulting fuel and water solution is fed through pump 20 and into stack 25. Circulation tank 35 can also be located between stack 25 and heat exchanger 37 so as to remove the carbon dioxide before the heat exchanger and thereby improve the performance of the heat exchanger. Further details are provided, for example, in U.S. Pat. No. 5,599,638.

Since water is a product of the reaction, high efficiency depends on the removal of water as it accumulates in fuel cell compartments. The present invention is based on allowing gravity to efficiently drain water from the fuel cell. As will be detailed below, proper design of the fuel cell will allow the removal of water to proceed with very high efficiency.

Biplate and Endplate

The biplate is a two-sided separator which prevents contact between the negative and positive electrodes of the fuel cell. In many embodiments, the biplate will be substantially planar, with a positive electrode on one side of the plane, and the corresponding negative electrode on the other side of the plane.

The endplate is a special class of biplate that is present at the end of a fuel cell stack, or if a stacked arrangement is not used, it serves as the ends of the cell. Two endplates are generally present in either the stacked or unstacked arrangement. It is also substantially planar in many embodiments, and includes conductive elements. Typically, one endplate will include an anode, and another endplate will include a cathode.

A preferred biplate assembly includes a) a substantially planar biplate, b) a plurality of conductive elements which provide electrical communication from one side of the biplate to the other, c) an air entrance port located at one edge of the biplate, to allow air to enter and remove water which accumulates during operation of the fuel cell, and d) an air exit which is located at another edge of the biplate, to allow air and water to leave the immediate area of the biplate.

Additionally, the biplates need not be thermally conductive. This is true since the fuels used in methanol fuel cells are typically at least 90% water. Thus the high heat capacity of water is available to absorb heat. Preferably, the fuels are at least 95% water, with the remainder comprising methanol. Fuel mixtures preferred for use in the methanol fuel cells of the invention are 97% water and 3% methanol.

The inventors noted that water tends to accumulate in fuel cell compartments at or near the cathode. For efficient fuel cell operation, this water is desirably continuously removed.

According to a particular embodiment, the plates of the liquid feed fuel cells are provided with a hydrophilic surface. Such surfaces have the desirable property of discouraging droplet formation, and allowing the formation of a sheet of water which is more easily drained by gravity. Thus, as soon as water is released at the cathode, it becomes part of a liquid layer that drains to the bottom of the biplate or endplate.

Hydrophilic plate surfaces are not difficult to create, but are difficult to maintain as hydrophilic. Such surfaces are high energy surfaces, and are therefore more reactive than hydrophobic surfaces. Although the claims are not limited by any particular theory, it is believed that air-borne organic contaminants can be absorbed or adsorbed onto such surfaces, causing them to become hydrophobic. Within an hour or so after creating a freshly sputtered metal surface, typical contaminants in the air result in a hydrophobic surface being created on typical fuel cell plates. According to the embodiment, hydrophilic plate surfaces can be created and maintained by the following procedure.

A first layer is applied to the surface, by any number of methods, such as brushing, spraying, pouring or other methods of producing a layer on a surface. Desirably, the layer is applied as a liquid, which is able to dry.

The surface of a fuel cell plate may need to be roughened in preparation for application of substances designed to impart a hydrophilic surface to the plate. Roughened metal surfaces can remain somewhat more hydrophilic than metal surfaces, simply due to increased surface area. Rough metal surfaces alone are not sufficiently hydrophilic to carry out the invention. The fuel cell plates are generally made of a metallic or graphite substrate. If these surfaces are very smooth, the first layer may not sufficiently adhere to the surface. Roughening of such materials can be carried out by a number of processes including mechanical, chemical or light produced roughening. Mechanical processes such as sandblasting or grinding with fine abrasives are most convenient, although chemical roughening by acids, for example, or laser roughening are also possible only those surfaces which will form the flow field, and only that the surface of the plate which will serve as the cathode need be roughened. The surface is roughened sufficiently to accept the deposition of a first layer, but not roughened to a degree which would lead to an uneven hydrophilic surface, after completion of the preparation of this surface.

Hydrophilic materials to be applied as a first layer include polymeric materials. These hydrophilic polymeric materials can be applied by any of the above-mentioned methods, including formation of such a layer in situ such as by polymerization on the roughened surface. Desirably, such materials are applied as liquids and are allowed to dry to a solidified state.

Examples of hydrophilic materials which can be applied to the plate surfaces include fluoropolymers such as perfluoropolyether sulfonic acid; polystyrenes such as polystyrene carboxylic acid and polystyrene sulfonic acid; polyallylamine; linear and branched polysaccharides such as dextran, pullulan, and polymaltotriose; cellulose and derivatives such as hydroxypropyl cellulose; acrylic acid polymers and acrylamide polymers including alkyl substituted acrylamides such as N,N-dimethyl acrylamide, polymethacrylic acid, N-isopropyl acrylamide, and the like; polyethylene oxides including hydroxy and methoxy terminated polyethylene oxides; polyethylene glycol, polypropylene glycol; polyvinyl compounds such as polyvinyl acetate, polyvinyl alcohol and polyvinyl butyral; polypyridine and polypyridinium compounds such as poly-2-vinyl-N-methyl pyridinium halide, poly-4-vinyl-N-methyl pyridinium halide, poly-2-vinylpyridine, polyvinyl pyrrolidone and salts of those compounds listed above which can form salts. Many of these compounds form random or block copolymers with each other or other polymers, and these are also useful for forming hydrophilic layers on surfaces. For example, copolymers of the following can be used: tetrafluoroethylene with perfluoropolyether sulfonic acid, polystyrene with poly-4-vinylpyridine, polyisoprene with poly-2-vinylpyridine, polybutadiene with poly-4-vinylpyridine, polymethylmethacrylic acid with poly-2-vinylpyridine, polyt-butylmethacrylate with poly-2-vinylpyridine, polyethylene with poly-2-vinylpyridine, polyethylene oxide with polystryene, and a number of other useful copolymers. These materials are most desirably applied as a liquid solution, and allowed to dry. Suitable liquid solutions can be made, for example, with water. Hydrophilic polymer solutions of from about 0.5% to about 50% are suitable for application. Drying of the polymer layer can be carried out by ambient drying, or with the use of applied heat, such as with a heat gun or similar device.

This layer can assist the creation of a hydrophilic surface, but further improvements were found to be possible. After the first layer of material is applied, and dried, a carbon/metal layer is applied. Desirably, this layer is applied as a finely divided solid.

Suitable materials include carbon/metal composites such as carbon-supported catalysts including carbon-supported platinum, palladium, platinum/palladium, platinum/palladium/gold, platinum/tin, platinum/rhodium, platinum/ruthenium, palladium/ruthenium, and many other carbon/metal composites.

The inventive plates have two further features to facilitate the removal of water from the fuel cell compartment.

First, the exit port is made large enough that water cannot significantly block the flow of air. For this reason, the water does not require a significantly greater amount of air or oxygen pressure to remove such unwanted water than would be required in the absence of such water. Such an exit port can be made by removing material from the plate, for example as is shown in FIG. 3.

FIG. 3 shows a particular embodiment of inventive fuel cell plate 40. The plate has flowfield 42, which includes conductive elements 44, embodied in FIG. 3 as pins (some pins have been removed for clarity of illustration). Also indicated is air flow path 46, which is generally perpendicular to plate 40, and directed through flowfield 42. Plate 40 also has circumferential rim 48, which forms a surface against which is pressed a membrane electrode assembly on at least one of the sides of the plate. Exit port 50 is formed by a surface 52, which is machined or otherwise fabricated from the material of the plate. Surface 52 is shown as a sloping plane, but can take on any number of other configurations, as long as the exit port thus formed is large enough to allow the air path to be substantially unimpeded by any water which collects at the end of flowfield 42 or further downstream in the air path. Most desirably, plate 40 is oriented vertically, so that end 54 is directed downwardly. This allows water to drain under the influence of gravity, minimizing the need for forced air flow, and thereby maximizing the efficiency of the cell.

The exit port is generally a rectangular channel formed at the end of a cell plate, as noted above. Its dimensions (width and height) are variable, but are up to about 80% of the thickness of the plate, and 80% of the width of the plate.

A wicking device extends from the edge of the biplate or endplate, and acts to wick water away from the port to avoid buildup. The wick can take the form of a surface which extends beyond the exit port at the lower region of the plate. In this way, water collects at a point beyond the exit port, and do not interfere with the air flow. At the edge of the insert, droplets form, grow in size, and subsequently drop into a separate collection vessel by the force of gravity. These droplets are not in the air flow stream, so they do not significantly contribute to flow resistance.

Such an insert is a surface which can be directly contiguous with the surface of the biplate or endplate. Alternatively, the insert is a surface which can be indirectly contiguous with the biplate or endplate surface, by means of an intermediate surface which leads a liquid from the biplate surface to the insert surface. This acts to extend the sheet of liquid which is present on the hydrophilic plate surface to allow droplet formation at a point where it does not interfere with the air flow path. Such an arrangement is illustrated in FIG. 4.

FIG. 4 shows plate 40 with conductive elements 44 which make up flowfield 42. At the edge of plate 40 is surface 52, which creates an expanded channel for exit port 50. Also included is insert 60, which extends from plate 40. Lower edge 62 of insert 60 allows a surface on which water can collect. The surface is out of the path of air flow, which moves through flowfield 42 and through exit port 50.

FIG. 5 shows an end view of plate 40 with insert 60 attached. Included are insert supports 64, which add strength to the assembly. Flowfield 42 is viewed edge-on in this figure, and conductive elements 44 have been omitted for clarity. Circumferential rim 48 is also depicted.

These features reduce the energy needed to keep liquid feed fuel cells operating at high efficiency, especially when such fuel cells are operated at relatively low temperatures (for example close to room temperature), in which temperature region the cell efficiency is not particularly high.

Conductive Elements

The biplates and endplates of the present invention need not be entirely electrically conductive. Only those points which are actually in contact with the fuel cell electrodes are required to be conductive. The biplates of the present invention necessarily include conductive elements which allow electrical communication between the media on each side of the biplate. The endplates of the present invention necessarily include conductive elements which allow electrical communication between the medium on one side of the endplate and an electrical load which is applied. This connection can be made through the back of an endplate, or through a side of the endplate.

Figure 6:
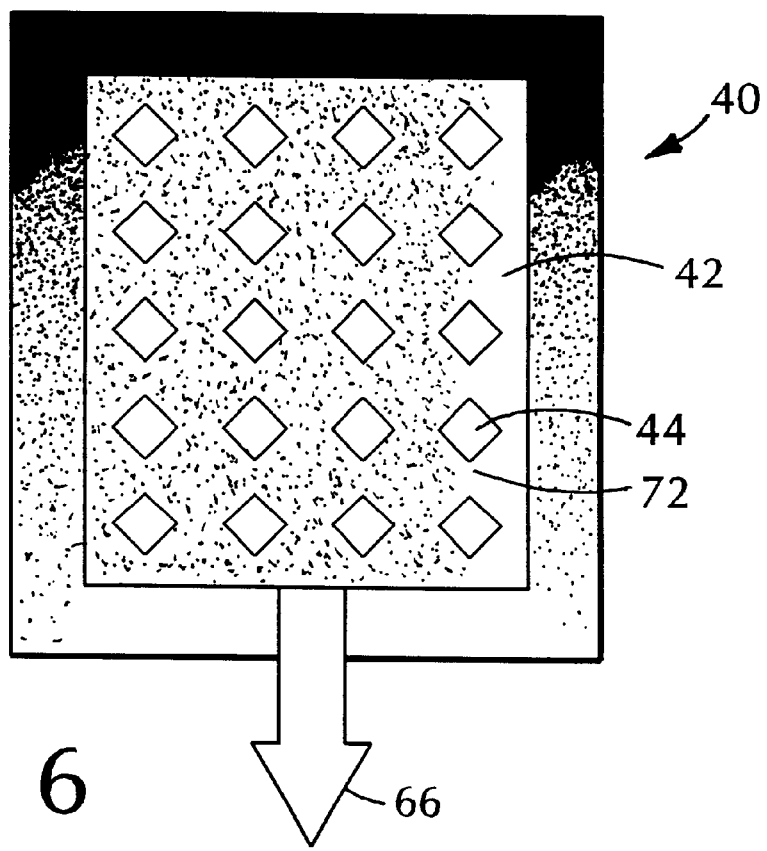
FIG. 6 is a front view of a plate of an embodiment.

Electrical current must pass from one side of a biplate to the other side. The conductive elements pass through the biplate and extend into the media on each side of the plate. As noted above, the biplate itself does not need to be conductive. The conductive elements can be arranged in any suitable pattern throughout the biplate. In some preferred embodiments, a plurality of such conductive elements define what is referred to as a "pincushion" pattern of conductive elements. FIG. 6 shows plate 40, which can be a biplate or endplate, having a particular embodiment of pincushion flowfield 42 made up of conductive elements 44. Fluid flow direction 66 is indicated. The "pincushion" can extend to both sides of the biplate.

Figure 7:
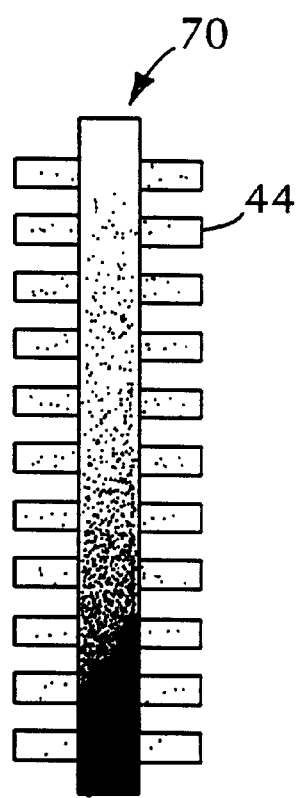
FIG. 7 is a side view of a biplate of an embodiment.

FIG. 7 is a side view of biplate 70, with a particular embodiment of a pincushion flowfield established on each side of the biplate, and made up of conductive elements 44. The conductive elements as pins or rods can extend directly through the biplate, or they can have electrical communication with an intermediate electrically conductive element, for example a plate located in the biplate. This pattern defines a flowfield, which is a collection of channels which allow fuel or air to disperse over the electrode. The pattern is not limited to that shown in the figures, but can take on a variety of patterns, regular and nonregular.

An endplate will typically have a flowfield on one of its surfaces, preferably the surface forming a wall of one of the fuel cell compartments. The conductive elements forming this flowfield will provide electrical communication with at least one, but preferably not more than about 5, electrical terminals. These terminals can be electrically connected to a load. Thus, in a stack, or an unstacked arrangement, electrical communication between anodic and cathodic endplates is made through an electrical load. This load is typically transportation, heating, and other useful loads.

The advantage of a pincushion flowfield over other types of flow field, such as a serpentine flowfield is that the contact points of a pincushion are geometrically simple. As compared to machining contact points out of a single block of material, the separate manufacture of pins and biplates or endplates is easy.

Optionally but desirably, the particular flowfield pattern employed allows the flow of fuel or air with as little resistance as possible, while still allowing diffusion of fuel or air to the conductive elements. This type of flowfield has been found to work well with methanol fuel cells. The walls of these channels serve as electrical contacts.

The invention features a particular configuration of pincushion flowfield for use in biplates and endplates in which the conductive elements are rectangular, square, diamond-shaped or triangular rods, or any other shape of rod having a cross section which includes at least one angle which is less than or equal to about 120°.

A particular embodiment of the pincushion flowfield is shown in FIG. 6. In this particular embodiment, conductive elements 44 are rods which are oriented so that angle 72 which is less than about 120° has its apex directed downward. This allows any water which accumulates on the rod to form a droplet at the apex of this angle, and more easily become detached from the conductive element by limiting the amount of adhesion between the growing water droplet and the rod surface.

The pincushion field is present on both sides of the biplate. This can be accomplished by having a single pin pass through the biplate and serve as the contact point for both the anode and cathode. Thus, the pins can be made completely separately from the biplate. The pins are not required to be the same on each side of the biplate. For example, certain embodiments can be constructed so that the pins are longer on one side of the biplate than they are on the other side. Alternatively, the shape of the pins need not be the same on each side of the biplate. Useful pins can be of any conveniently prepared dimension, but good impedances (not more than about 2% of the MEA impedance) are obtained with pins of diameters from about $\frac{1}{16}$" to about $\frac{1}{4}$". The pins can extend from about 0.2 mm to about 5 mm from the surface of the plates. The pins can be spaced anywhere from about 0.2 mm to about 5 mm apart.

For endplates, the electrically conductive elements may or may not pass completely through the component. If the conductive elements do pass completely through the endplate, it may be desirable to electrically join all the electrically conductive elements to allow a minimum number of terminals for connection to the load. This can be done by providing an electrically conductive plate, for example, which is in contact with the electrically conductive elements on the side of the endplate which is opposite a particular fuel cell compartment. This conductive plate could be overlaid with an electrically non-conductive plate of substantially the same size, to allow electrical insulation between the endplate and backplate. Alternatively, the backplate could be assembled adjacent to such an electrically conductive plate, as long as the backplate is made of an electrically non-conductive material.

The conductive elements of the invention are generally made of metal or graphite or other conductive materials. A long square or rectangular rod of an electrically conductive material (metal or graphite, for example) can be formed and chopped into many "pins". Alternatively, round "pins" can be made out of a cylindrical rod.

OTHER EMBODIMENTS

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims.

What is claimed is:

1. A plate assembly for use adjacent to membrane electrode assemblies in a liquid fuel cell, the assembly comprising:
   a) at least one substantially planar and vertically oriented plate having a first layer of carbon/metal composite overlaying a second layer of hydrophilic polymer or copolymer;
   b) a plurality of conductive elements extending from at least one surface of the plate, providing electrical communication through the plate;
   c) an air inlet port and an air exit port formed on the plate in locations to establish an air flow path; and
   d) a surface, directly or indirectly contiguous with the substantially planar and vertically oriented plate, located at the air exit port, whereby liquid is withdrawn from the air flow path.

2. The assembly of claim 1, wherein the carbon/metal composite comprises a platinum-based alloy.

3. The assembly of claim 2, wherein the carbon/metal composite comprises a platinum/ruthenium catalyst.

4. The assembly of claim 1, wherein the carbon/metal composite is a carbon-supported platinum/ruthenium catalyst.

5. The assembly of claim 1, wherein the conductive elements are arranged in a pincushion array.

6. The assembly of claim 1, wherein the conductive elements comprise graphite.

7. The assembly of claim 1, wherein the conductive elements are rods.

8. The assembly of claim 7, wherein the rods have a cross section comprising an angle of less than or equal to about 120°.

9. The assembly of claim 8, wherein the angle of less than or equal to about 120° is directed downwardly.

10. The assembly of claim 9, wherein the cross section is selected from the group consisting of square, rectangular, diamond-shaped and triangular.

11. The assembly of claim 1, wherein the air entrance and exit ports are from about 20% the width of the plate to about 80% of the width of the plate.

12. The assembly of claim 1, wherein the surface located at the air exit port is a surface which extends below the air exit port.

13. The assembly of claim 1, wherein the liquid is water.

14. The assembly of claim 1, wherein the hydrophilic polymer or copolymer is selected from the group consisting of fluoropolymers, polystyrenes, polyallylamine, linear and branched polysaccharides, cellulose and hydroxypropyl cellulose, acrylic acid polymers and acrylamide polymers, polyethylene oxides, polyethylene glycol, polypropylene glycol, polyvinyl compounds, polypyridine and polypyridinium compounds, and copolymers thereof.

15. The assembly of claim 14, wherein the hydrophilic polymer is a fluoropolymer.

16. The assembly of claim 15, wherein the fluoropolymer is a fluorinated polymeric hydrocarbon.

17. The assembly of claim 16, wherein the fluorinated polymeric hydrocarbon is a copolymer of tetrafluoroethylene and perfluorinated polyether sulfonic acid.

18. A liquid feed fuel cell system comprising:
   a) a plate assembly comprising:
      1) at least one substantially planar and vertically oriented plate having a first layer of carbon/metal composite overlaying a second layer of hydrophilic polymer or copolymer;
      2) a plurality of conductive elements extending from at least one surface of the plate, providing electrical communication through the plate;
      3) an air inlet port and an air exit port formed on the plate in locations to establish an air flow path; and
      4) a surface, directly or indirectly contiguous with the substantially planar and vertically oriented plate, located at the air exit port, whereby liquid is withdrawn from the air flow path;
   b) an oxidant supply, which supplies an oxidant to at least one surface of at least one plate;
   c) a liquid fuel supply, which supplies liquid fuel to at least one surface of at least one plate; and
   d) an electrical load which is in electrical contact with the electrically conductive elements of at least two of the plates.

19. A method of generating power with a liquid feed fuel cell system assembly comprising:
   a) at least one substantially planar and vertically oriented plate having a first layer of carbon/metal composite overlaying a second layer of hydrophilic polymer or copolymer; a plurality of conductive elements extending from at least one surface of the plate, providing electrical communication through the plate; an air inlet port and an air exit port formed on the plate in locations to establish an air flow path; and a surface, directly or indirectly contiguous with the substantially planar and vertically oriented plate, located at the air exit port, whereby liquid is withdrawn from the air flow path; and
   b) operating the fuel cell system in such a way that allows water to be removed from the fuel cell.

* * * * *